No. 678,870. Patented July 23, 1901.
A. R. GREVER.
FILTER.
(Application filed Nov. 8, 1900.)

(No Model.)

WITNESSES:

INVENTOR
Albert R. Grever,
BY John R. Nolan
ATTORNEY

UNITED STATES PATENT OFFICE.

ALBERT R. GREVER, OF PHILADELPHIA, PENNSYLVANIA.

FILTER.

SPECIFICATION forming part of Letters Patent No. 678,870, dated July 23, 1901.

Application filed November 8, 1900. Serial No. 35,789. (No model.)

*To all whom it may concern:*

Be it known that I, ALBERT R. GREVER, a citizen of the United States, residing in the city and county of Philadelphia, in the State of Pennsylvania, have invented certain new and useful Improvements in Filters, of which the following is a full, clear, and exact description, reference being had to the accompanying drawings, forming a part of this specification.

This invention relates to an improvement in filters, and particularly in the valve mechanism thereof.

The improvement has been designed with especial reference to the filtering apparatus forming the subject of my Letters Patent of the United States No. 661,339, dated November 6, 1900. Briefly described, the said apparatus comprises a casing in which the filtering material is contained, a stand-pipe connected at its upper end with the supply-pipe and extended through and below the filtering material, inlet and outlet connections between the supply-pipe and the upper end of the casing, said connections being located on the respective sides of the union of the stand-pipe with the supply-pipe, three-way valves in said connections, respectively, and means for simultaneously manipulating and setting said valves, whereby water or other fluid may at one time be directed through the inlet connection to the top of the filtering-bed preparatory to filtration, the filtered liquid returning through the stand-pipe to the discharge portion of the supply-pipe and being thereby discharged, or whereby the water or other fluid may at another time be directed through the stand-pipe to the bottom of the filter, then be returned through the filtering-bed, so as to cleanse the latter, thereupon passing off through the outlet connection to the discharge portion of the supply-pipe. The said apparatus also includes in its construction a distributing member of peculiar construction contained within the casing between the inlet connection and the filtering material, all as will more fully appear by reference to the said patent.

The object of my present invention is to provide a novel valve connection between the several pipes and the interior of the filter, whereby the said inlet and outlet connections, with their respective valves and valve-actuating devices, together with the distributing-plate, are dispensed with, and yet the functions of the said omitted parts are effectively performed, as will be hereinafter fully set forth.

Figure 1:
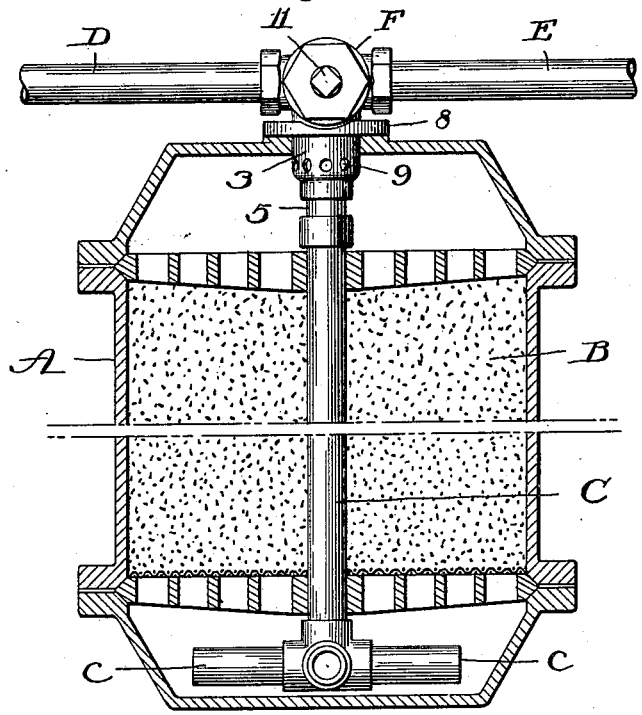
Figure 2:
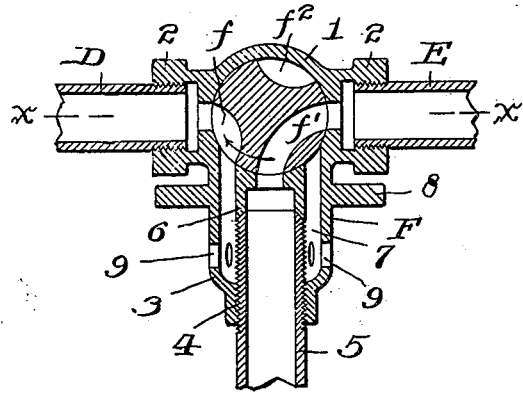
Figure 3:
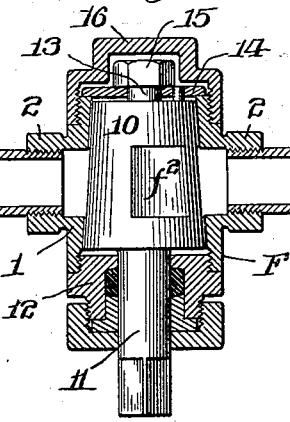

In the drawings, Figure 1 is a sectional elevation of a filter embodying my invention. Fig. 2 is a vertical section through the valve and its connections. Fig. 3 is a horizontal section as on the line $x\ x$ of Fig. 2.

A is the cylinder or casing, and B the filtering material therein.

C is the stand-pipe, extending centrally through the cylinder and terminating at its lower end in a series of radial branch pipes $c$, contained within and opening into a space or chamber below the filtering material.

D is a supply-pipe, E a discharge-pipe, and F a valve of novel construction and operation uniting the supply and discharge pipes with the upper end of the stand-pipe and with the interior of the filter.

The construction and operation of the valve are as follows:

1 is a casing provided with oppositely-disposed necks 2, to which are screwed the supply and discharge pipes D E, respectively. This casing is provided with a depending tubular extension 3, the lower end of which is contracted and internally threaded, as at 4, to receive an externally-threaded pipe-section 5, that rises into the extension and abuts against the lower end of a centrally-disposed ring 6, formed or secured directly below the valve-seat. There is thus provided in the extension an annular space 7. The tubular extension depends through the head of the cylinder and is securely fastened thereto. In the present instance the extension is provided with an external flange 8, which is bolted to the head of the cylinder. The section 5 projects below the extension to afford a nipple to which the upper end of the stand-pipe C is secured. The wall of the extension is provided near its lower end with a circular series of apertures 9, whereby communication is afforded between the annular space and the interior of the filter-cylinder. A tapered valve-key 10 is seated within the casing. This key is provided with three ports $f\ f'\ f^2$, which are so relatively arranged that when the key occupies the position shown in Fig. 2 the port $f$ establishes communication between the supply-pipe and the annular space 7, while the port $f'$ affords communication between the stand-pipe and the discharge-pipe, and that when the key is turned a quarter-turn in the direction indicated by the arrow the port $f'$ establishes communication between the supply-pipe and the stand-pipe, while the port $f^2$ affords communication between the annular space 7 and the discharge-pipe.

When the valve occupies the position indicated in the drawings, the water or other liquid is delivered by the supply-pipe into the annular space 7 and coursing around therein is distributed by way of the apertures 9 upon and about the top of the filtering-bed, thence percolating through the latter. The filtered liquid rises through the stand-pipe and passes off by way of the discharge-pipe. When the valve occupies the other described position, the liquid from the supply-pipe passes directly into the stand-pipe and is discharged therefrom below the filtering-bed, thence rising through and cleansing the filtering material, thence passing through the apertures into the annular space, and thence passing off by way of the discharge-pipe.

The key is provided at its larger end with a central stem 11, which extends through a suitable stuffing-box 12 on one side of the casing to facilitate the manipulation of the valve. The opposite end of the key is provided with a central stud 13, on which is fitted a disk or washer 14, that bears against the opposing end of the casing, said disk or washer being held in place by a nut 15 on the stud. On this end of the casing is a suitable screw-cap 16. This manner of mounting and confining the key obviates all liability of leakage about the valve.

I claim—

1. The combination with the casing, the filtering-bed, the supply-pipe, the discharge-pipe, and the stand-pipe, of the valve connection for said pipes comprising a casing to which the supply and discharge pipes are connected, an extension on said casing to which the stand-pipe is connected, said extension being provided with a space having an exit to the filtering-bed, at a point between the latter and the top of the casing and a key seated in said valve-casing and provided with a series of ports arranged with relation to the said pipes and space, substantially as set forth.

2. The combination with the casing, the filtering-bed, the supply-pipe, the discharge-pipe, and the stand-pipe, of the valve connection for the said pipes, comprising a casing to which the supply and discharge pipes are connected, a laterally-perforated extension on said casing provided with an internal ring, a pipe-section extended into said extension and seated against said ring to afford within the extension an annular space, said section affording a connection for the stand-pipe, and a key seated in said valve-casing and provided with three ports arranged with relation to the said pipes and annular space, substantially as set forth.

In testimony whereof I have hereunto affixed my signature in the presence of two subscribing witnesses.

ALBERT R. GREVER.

Witnesses:
JOHN R. NOLAN,
ANDREW V. GROUPE.